(12) United States Patent
Iimoto

(10) Patent No.: US 12,420,557 B2
(45) Date of Patent: Sep. 23, 2025

(54) RECORDING APPARATUS, MANAGEMENT SERVER, ORDERING SYSTEM, RECORDING METHOD USING RECORDING APPARATUS, AND STORAGE MEDIUM

(71) Applicant: CANON KABUSHIKI KAISHA, Tokyo (JP)

(72) Inventor: Keiichi Iimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 176 days.

(21) Appl. No.: 18/176,531

(22) Filed: Mar. 1, 2023

(65) Prior Publication Data
US 2023/0202187 A1   Jun. 29, 2023

Related U.S. Application Data

(63) Continuation of application No. PCT/JP2021/027401, filed on Jul. 21, 2021.

(30) Foreign Application Priority Data

Sep. 8, 2020   (JP) ................................ 2020-150473

(51) Int. Cl.
   *B41J 2/175*   (2006.01)
(52) U.S. Cl.
   CPC .................. *B41J 2/17566* (2013.01)
(58) Field of Classification Search
   CPC .... B41J 2/17566; B41J 2/17546; B41J 2/175; B41J 2/17506; B41J 2/17509; B41J 2/17553; B41J 2002/17569; B41J 2002/17573; B41J 2002/17576; B41J 2002/17579; B41J 2002/17583;
   (Continued)

(56) References Cited

U.S. PATENT DOCUMENTS

| 8,371,673 B2 | 2/2013 | Maru |
| 8,651,616 B2 | 2/2014 | Maru |

(Continued)

FOREIGN PATENT DOCUMENTS

| JP | 2008-254395 A | 10/2008 |
| JP | 2008-290451 A5 | 12/2008 |

(Continued)

OTHER PUBLICATIONS

Jun. 11, 2024 Japanese Official Action in Japanese Patent Appln. No. 2020-150473.

(Continued)

*Primary Examiner* — Kristal Feggins
(74) *Attorney, Agent, or Firm* — Venable LLP

(57) ABSTRACT

A recording apparatus including an ink tank storing ink supplied from an ink bottle and a head to which ink is supplied from the ink tank includes a determination unit configured to determine a value related to ink consumption in the ink bottle based on a value related to ink consumption in the ink tank, and a transmission unit configured to transmit information indicating the value related to the ink consumption in the ink bottle to a server in a case where the value related to the ink consumption in the ink bottle reaches a predetermined threshold value, and performs processing of ordering of a new ink bottle based on the amount of ink consumed in the ink bottle.

14 Claims, 11 Drawing Sheets

(58) Field of Classification Search
CPC .. B41J 2002/17586; B41J 2002/17589; G03G 21/00; G06Q 10/00; G06Q 30/06
See application file for complete search history.

(56) References Cited

U.S. PATENT DOCUMENTS

| | | |
|---|---|---|
| 10,744,782 B2 | 8/2020 | Miyazawa |
| 2008/0266336 A1 | 10/2008 | Maru |
| 2013/0120491 A1 | 5/2013 | Maru |
| 2019/0299645 A1 | 10/2019 | Miyazawa |
| 2019/0354325 A1 | 11/2019 | Sonehara |

FOREIGN PATENT DOCUMENTS

| | | | | |
|---|---|---|---|---|
| JP | 2015-090384 A | 5/2015 | | |
| JP | 2016-179677 A5 | 10/2016 | | |
| JP | 2017-209851 | * 11/2017 | ................ | B41J 2/01 |
| JP | 2017-209851 A | 11/2017 | | |
| JP | 2019-059200 | * 4/2019 | .............. | B41J 2/175 |
| JP | 2019-059200 A | 4/2019 | | |
| JP | 2019-175295 A | 10/2019 | | |
| JP | 2019-200334 | * 11/2019 | .............. | B41J 29/38 |
| JP | 2019-200334 A | 11/2019 | | |

OTHER PUBLICATIONS

Oct. 26, 2021 International Search Report in International Patent Appln. No. PCT/JP2021/027401.

* cited by examiner

FIG.7A

| PRINTER SERIAL NUMBER | DATE AND TIME | CONSUMABLE-TYPE INFORMATION | ORDER BLACK | ORDER YELLOW | ORDER CYAN | ORDER MAGENTA |
|---|---|---|---|---|---|---|
| AAAA1111 | 2020/06/09 14:30 | INK BOTTLE | Yes | No | Yes | No |
| BBBB2222 | 2020/06/14 08:20 | INK BOTTLE | Yes | Yes | Yes | Yes |
| AAAA1111 | 2020/06/21 17:00 | INK BOTTLE | No | Yes | No | No |

FIG.7B

| PRINTER SERIAL NUMBER | MODEL NUMBER OF BLACK | MODEL NUMBER OF Yellow | MODEL NUMBER OF Cyan | MODEL NUMBER OF Magenta |
|---|---|---|---|---|
| AAAA1111 | ABC-<Bk>L | ABC-<Y>L | ABC-<C>L | ABC-<M>L |
| BBBB2222 | ABC-<Bk>L | ABC-<Y>M | ABC-<C>M | ABC-<M>M |

INK
CONSUMPTION
AMOUNT
= 0 %

INK
CONSUMPTION
AMOUNT
= 90 %

INK
CONSUMPTION
AMOUNT
= 100 %

# RECORDING APPARATUS, MANAGEMENT SERVER, ORDERING SYSTEM, RECORDING METHOD USING RECORDING APPARATUS, AND STORAGE MEDIUM

CROSS-REFERENCE TO RELATED APPLICATIONS

This application is a Continuation of International Patent Application No. PCT/JP2021/027401, filed Jul. 21, 2021, which claims the benefit of Japanese Patent Application No. 2020-150473, filed Sep. 8, 2020, all of which are hereby incorporated by reference herein in their entirety.

BACKGROUND

Field

The present disclosure relates to a technique to order a consumable of a recording apparatus.

Description of the Related Art

Recording apparatuses which can be connected to the Internet and can communicate with a WEB server have appeared in recent years. Japanese Patent Laid-Open No. 2015-90384 proposes a consumable-ordering system in which a recording apparatus detects the state of the remaining amount of a cartridge consumable supplying a head in the recording apparatus with ink and orders the cartridge consumable in a case where the remaining amount of the consumable becomes a predetermined threshold value or lower.

SUMMARY

However, in the case of using the technique of Japanese Patent Laid-Open No. 2015-90384, an order may not be placed at appropriate timing in an ink bottle recording apparatus in which ink is injected from an ink bottle into an ink tank for supplying a head with ink. For example, an ink bottle may be ordered in a state where the ink bottle includes a sufficient amount of ink or where the ink bottle has already run out of ink.

An object of the present disclosure is to provide a technique to enable ordering of an ink bottle at appropriate timing.

A recording apparatus according to an aspect of the present disclosure is a recording apparatus including an ink tank storing ink supplied from an ink bottle and a head to which ink is supplied from the ink tank, the recording apparatus including a determination unit configured to determine a value related to ink consumption in the ink bottle based on a value related to ink consumption in the ink tank, and a transmission unit configured to transmit information indicating the value related to ink consumption in the ink bottle to a server in a case where the value related to the ink consumption in the ink bottle reaches a predetermined threshold value.

According to the present disclosure, an ink bottle can be ordered at appropriate timing.

Further features of the present disclosure will become apparent from the following description of exemplary embodiments with reference to the attached drawings.

BRIEF DESCRIPTION OF THE DRAWINGS

FIGS. 7A and 7B are tables stored in a database of a management server;

DESCRIPTION OF THE EMBODIMENTS

A preferred embodiment of the present disclosure will be described in detail below with reference to the accompanying drawings. It should be noted that the following embodiment does not limit the present disclosure according to claims, and not all combinations of features described in the present embodiment are essential to the solution of the present disclosure.

Configuration of Consumable-Ordering System 100

Figure 1:
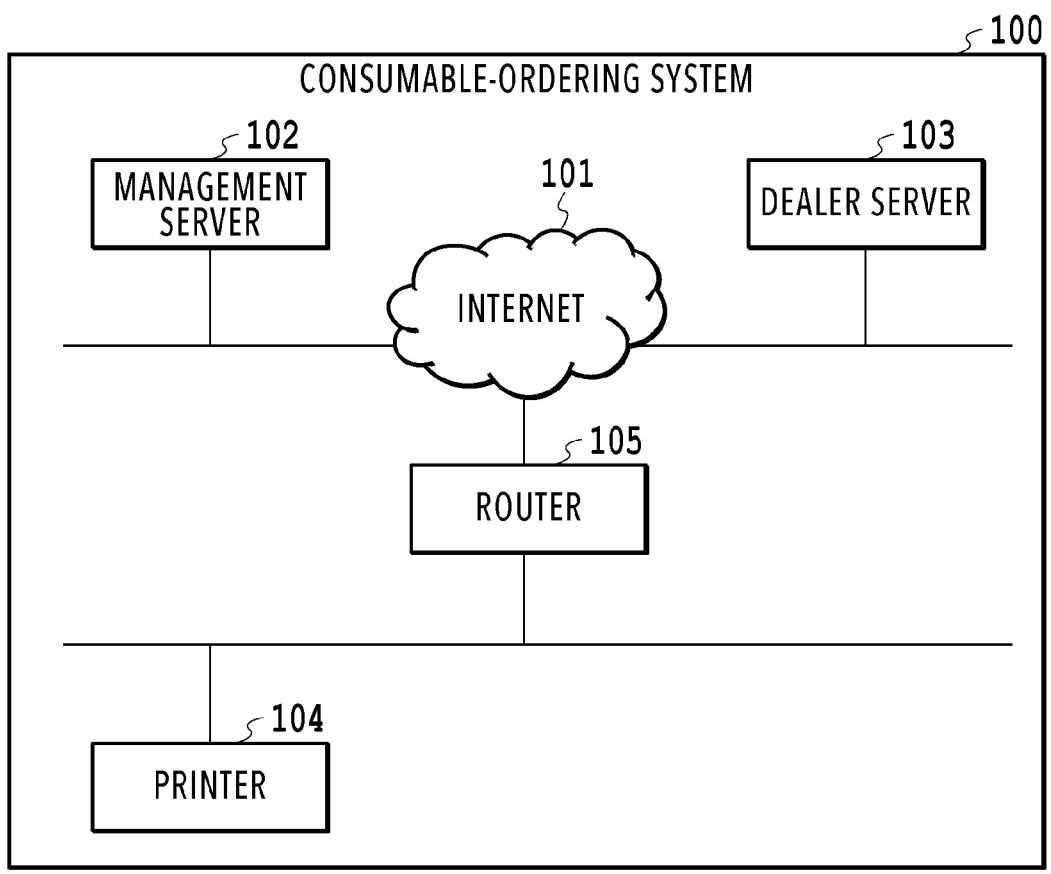
FIG. 1 is a diagram showing a configuration of a consumable-ordering system.

FIG. 1 is a diagram showing an example of a configuration of the consumable-ordering system 100 in the present embodiment. The configuration of the consumable-ordering system 100 in the present embodiment will be described below with reference to FIG. 1. As shown in FIG. 1, the consumable-ordering system 100 in the present embodiment includes a management server 102 that performs processing of ordering of an ink bottle, a dealer server 103 relating to ink bottle distribution, and a printer 104, which is a recording apparatus. Incidentally, in the present embodiment, the consumable-ordering system 100 is a system including a recording apparatus and one or more servers. In the case of FIG. 1, the configuration includes a recording apparatus, a management server, and a dealer server but may include the recording apparatus and a single server that combines the functions of the management server and dealer server.

The management server 102 and the dealer server 103 are each connected to the Internet 101. The printer 104 can be connected to the Internet via a router 105. The management server 102 can manage information transmitted from the printer 104 and provide the information transmitted from the printer 104 to the dealer server 103 via the Internet 101. Each communication is controlled via HTTP, XMPP, or the like. It should be noted that a protocol is not limited to them, and other protocols may be used.

Configuration of Server

Figure 2:
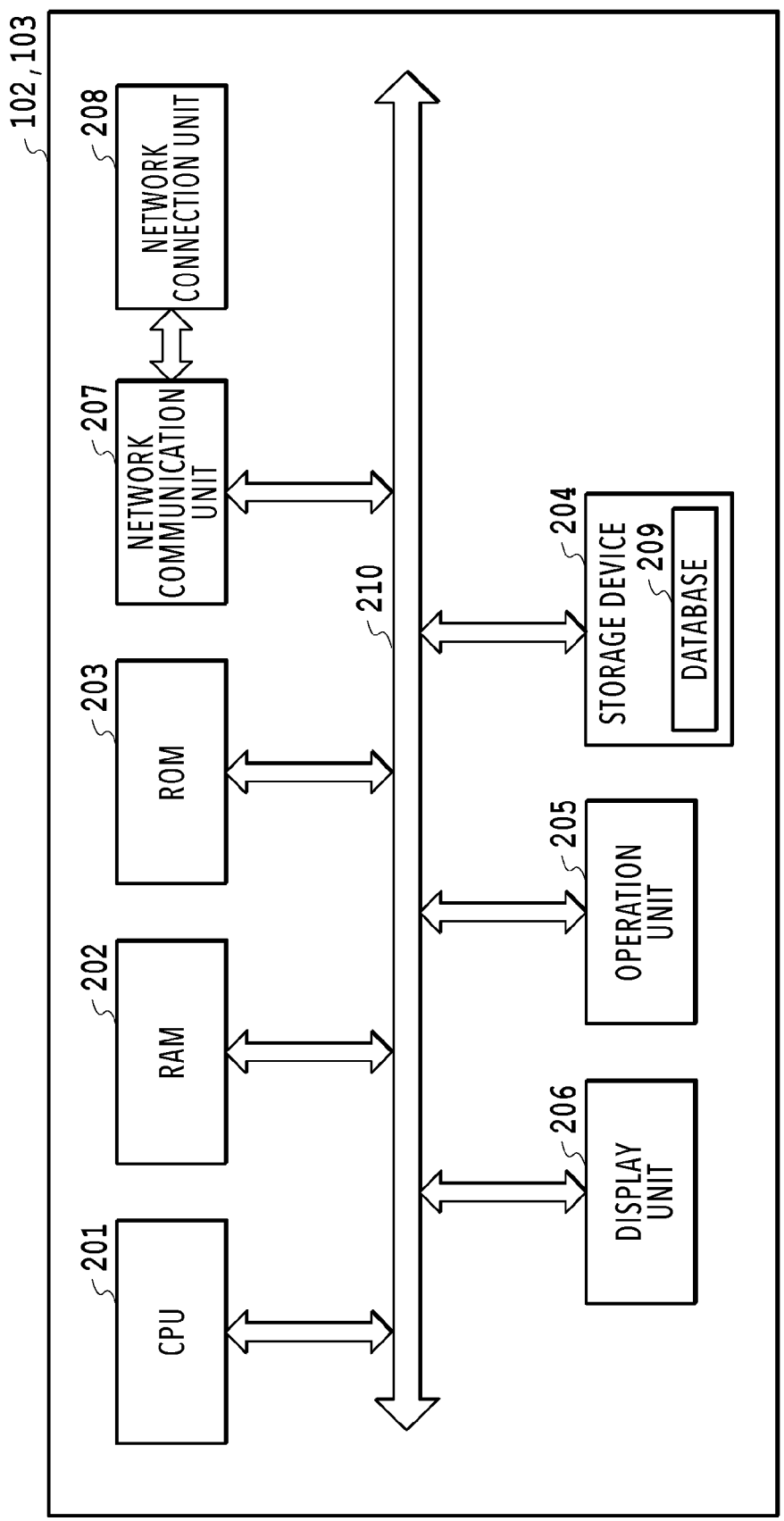
FIG. 2 is a diagram showing a hardware configuration of a server.

FIG. 2 is a block diagram showing an example of a hardware configuration of the management server 102. The configuration of the management server 102 in the present embodiment will be described below with reference to FIG. 2. The management server 102 includes a CPU 201, a RAM 202, a ROM 203, a storage device 204, an operation unit 205, a display unit 206, a network communication unit 207, and a network connection unit 208.

The CPU 201 is a central processing unit for controlling each unit of the management server 102. The RAM 202 serves as a working memory required in a case where the CPU 201 executes a program. The ROM 203 is a reading-only memory for storing the program executed by the CPU 201. The storage device 204 is a device for storing a database 209 and various types of information and is a non-volatile storage device such as a magnetic disk or flash memory. The operation unit 205 includes a keyboard, a mouse, and the like for a user to perform various input operations. The display unit 206 includes, for example, an LCD. Various types of information are displayed on the display unit 206 and presented to the user. The network communication unit 207 is connected to a network such as the Internet 101 via the network connection unit 208 and performs various communications. The units described above are interconnected over a bus 210 and can transmit and receive data to and from each other.

It should be noted that the dealer server 103 has the same hardware configuration as that of the management server 102, and the description thereof is omitted. However, the dealer server 103 may have a hardware configuration different from that of the management server 102. In FIG. 2, each of the dealer server 103 and the management server 102 includes one server device (information processing device), but may be configured as a server system including one or more servers. Alternatively, each of the dealer server 103 and the management server 102 may have a configuration of operating on a virtual server using a cloud service.

Hardware Configuration of Recording Apparatus

Figure 3:
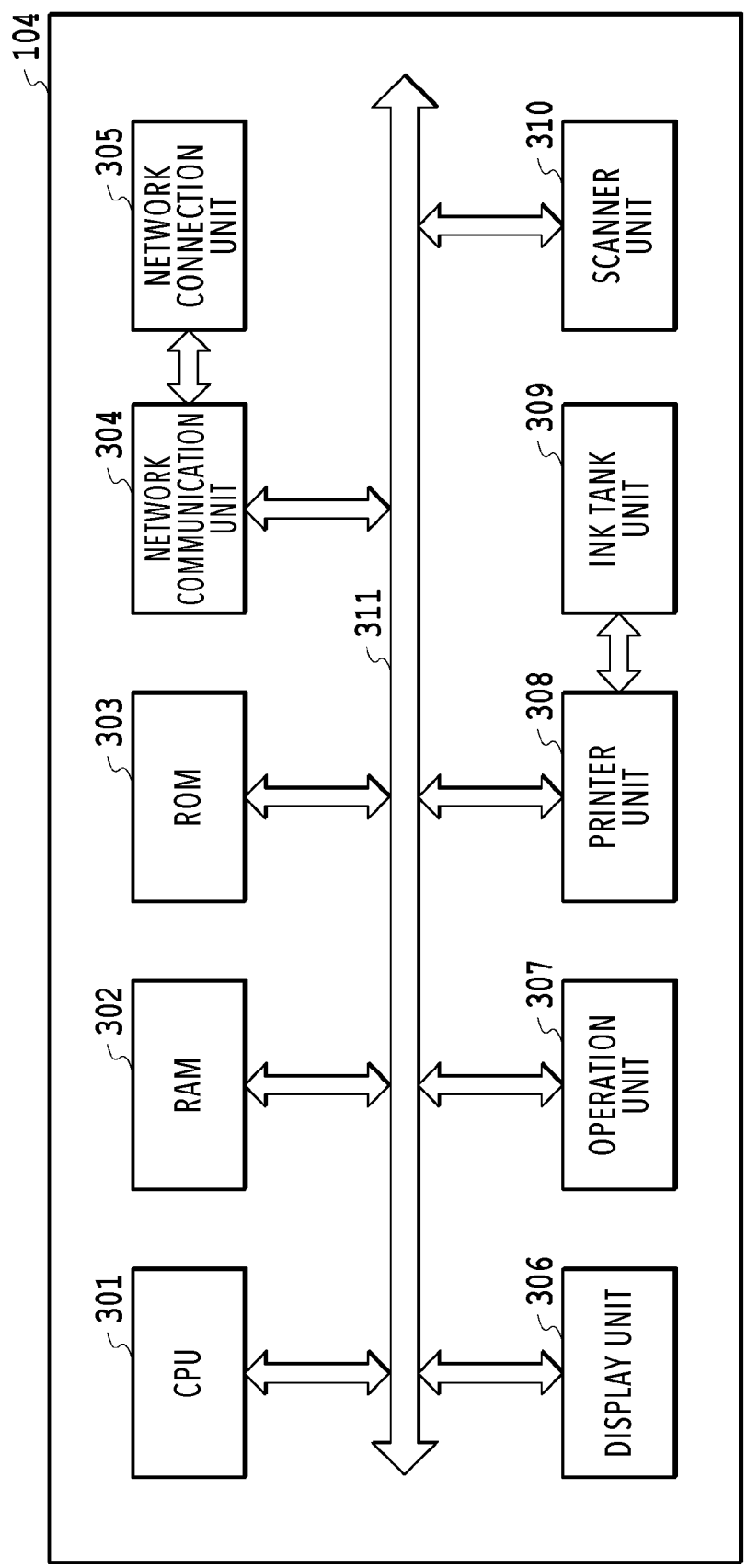
FIG. 3 is a diagram showing a hardware configuration of a recording apparatus.
Figure 4A:
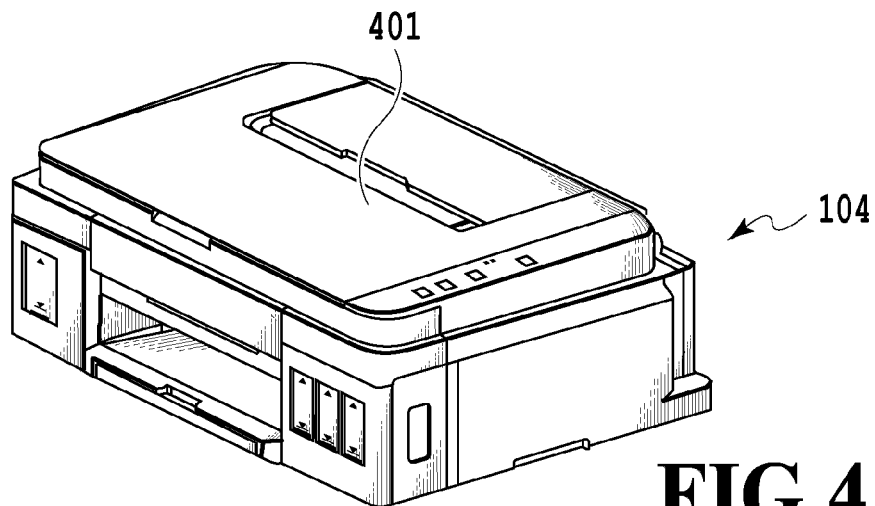
FIGS. 4A to 4C are schematic diagrams of the recording apparatus.
Figure 4B:
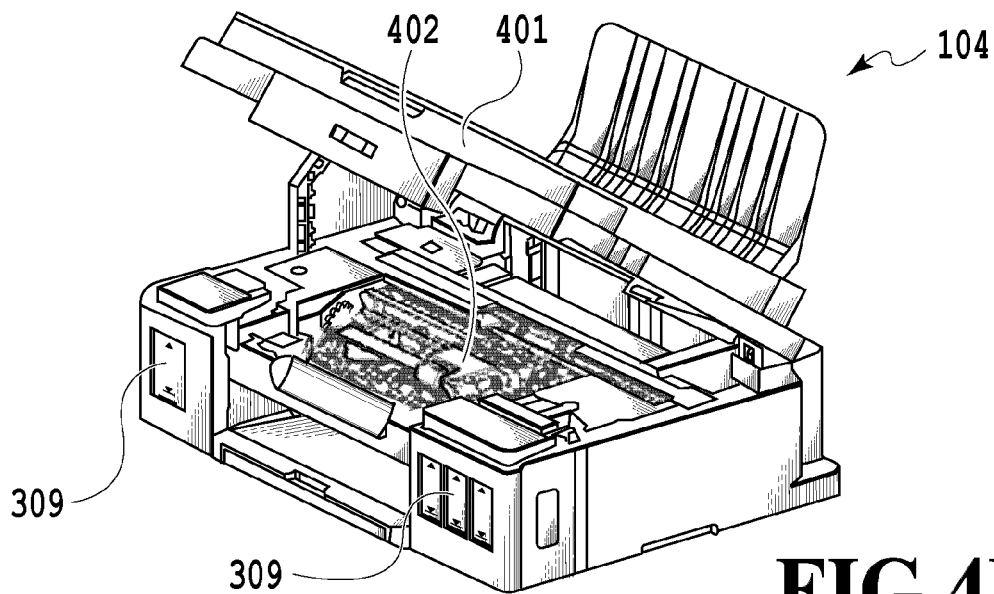
Figure 4C:
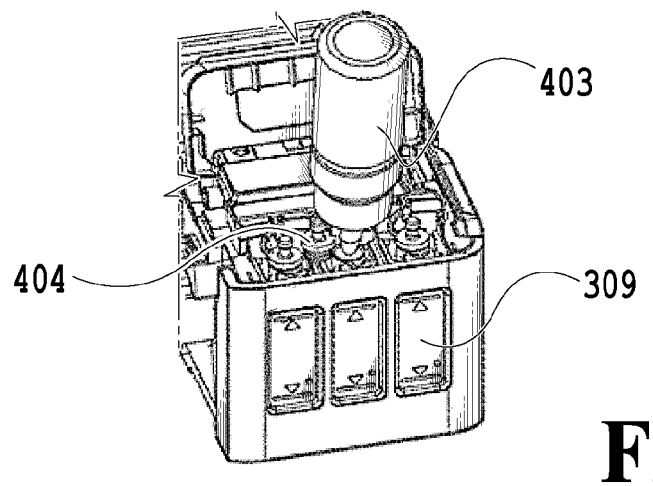

FIG. 3 is a block diagram showing an example of a hardware configuration of the printer 104. FIGS. 4A to 4C are schematic diagrams of the recording apparatus. FIGS. 4A and 4B are schematic diagrams showing states where a body cover 401 of the printer 104 is closed and open, respectively. FIG. 4C is a schematic diagram of a state where an ink bottle 403 is held at an ink inlet 404 of an ink tank unit 309 of the printer 104 and ink is being injected from the ink bottle 403. The configuration of the printer 104 in the present embodiment will be described below with reference to FIGS. 3 and 4A to 4C. Incidentally, in the case of an ink cartridge, ink is replenished by replacing an old ink cartridge installed in the printer with a new ink cartridge. However, in the case of an ink bottle, ink is replenished by injecting ink from the ink bottle into an ink tank in a printer.

The printer 104 includes a printer unit 308, a scanner unit 310, and an ink tank unit 309. The printer 104 also includes a CPU 301, a display unit 306, an operation unit 307, a network communication unit 304, and a network connection unit 305. Incidentally, in the present embodiment, the printer 104, which is a multi-function machine, will be described as an example of recording apparatuses. However, the present embodiment may use a recording apparatus other than a printer. As an example of applicable recording apparatuses, a copier, facsimile, or the like may be used. Alternatively, a recording apparatus without a scanner function may also be used.

In the printer 104, the printer unit 308 implements a printing function, and the scanner unit 310 implements a scanner function. The ink tank unit 309 is provided for each ink color and stores ink. As shown in FIG. 4C, the ink tank unit 309 includes the ink inlet 404 and can be replenished with ink, which is a consumable, from the ink bottle 403, which is a container. The capacity of the ink bottle 403 described below is larger than the capacity of an ink tank in the ink tank unit. Thus, one ink bottle can be used to inject ink multiple times. However, the present embodiment is applicable to a case other than the case where the capacity of the ink bottle 403 is larger than the capacity of the ink tank. For example, the capacity of the ink bottle 403 may be the same as the capacity of the ink tank, or the capacity of the ink bottle 403 may be smaller than the capacity of the ink tank.

The printer unit 308 includes a head 402, which is an ink ejection unit, where ink is supplied to the head 402 from each ink tank unit 309 through a tube. The printer unit 308 also records (i.e., prints) an image on a recording medium such as a printing sheet (not shown) by an inkjet method based on image data received from the outside, image data read by the scanner unit 310, or the like. The printer unit 308 further manages paper information including ink information and information on the number of stacked sheets. The ink information is information including the remaining amount of ink. The printer unit 308 of the present embodiment manages information on ink in an ink tank and information on ink in an ink bottle. Ink information and sheet information managed by the printer unit 308 may be managed by placing a non-volatile memory in the printer unit, or may be managed by a non-volatile RAM 302 or rewritable ROM 303 in the printer 104.

The scanner unit 310 optically reads a document set on a document platen (not shown), converts the document into electronic data, and transmits the image data further converted into a specified file format to an external device via a network or stores the image data in a storage area (not shown) such as an HDD. The copy function is implemented by transferring the image data generated by reading the document placed on the document platen with the scanner unit 310 to the printer unit 308 and recording, by the printer unit 308, an image on a storage medium based on the image data.

The CPU 301 is a central processing unit for controlling each unit in the printer 104. The ROM 303 stores various program codes and an application for communicating with the management server 102. An application module generates status information to be described later. In the RAM 302, image data or the like is temporarily stored during execution of each service, or buffering is performed. The display unit 306 includes, for example, an LCD, and displays various types of information. The operation unit 307 includes a switch or the like for the user to perform various input operations. A network communication unit 304 is connected to the router 105 via the network connection unit 305. That is, the network communication unit 304 is connected to a network such as the Internet 101 via the network connection unit 305 to perform various communications. The various communications are controlled via HTTP, XMPP, or the like. It should be noted that a protocol is not limited to them, and another protocol may be used. The RAM 302 also stores image data and the like received by the network communication unit 304. The units described above are interconnected over a bus 311 and can transmit and receive data to and from each other.

Software Configuration of Recording Apparatus

Figure 5:
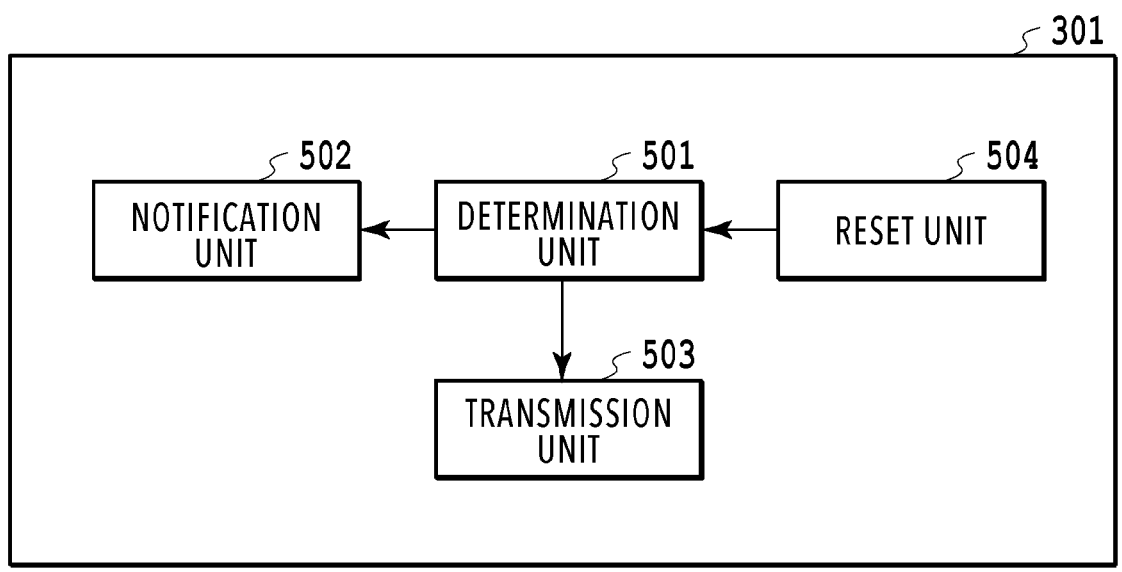
FIG. 5 is a diagram showing a software configuration of the recording apparatus.

FIG. 5 is a diagram showing an example of a functional configuration relating to ink bottle ordering processing in the CPU 301 of the recording apparatus. The software configuration of the recording apparatus in the present embodiment will be briefly described below with reference to FIG. 5. The CPU 301 includes a determination unit 501, a notification unit 502, a transmission unit 503, and a reset unit 504.

The determination unit 501 determines the amount of ink remaining in each ink tank (hereinafter simply referred to as an ink tank remaining amount) and the amount of ink consumed in each ink bottle (hereinafter simply referred to as an ink bottle consumption amount). Specifically, the ejection amount of ink ejected from the head 402 is first counted in the printer unit 308 to specify the amount of ink consumed in the ink tank based on a count value. Each ink tank remaining amount (information on ink in the ink tank) is specified based on the specified ink tank consumption amount. The amount of ink consumed in the ink bottle may also be specified based on the count value of the ejection amount of ink ejected from the head 402.

The present example has been described as detecting the ink tank remaining amount based on the count value of the amount of ejected ink. However, the ink tank may be provided with a remaining liquid sensor to detect the ink tank remaining amount based on a value detected by the remaining liquid sensor. Additionally, the amount of ink consumed in an ink bottle is not limited to the above example. For example, each ink bottle consumption amount (information on ink in the ink bottle) may be calculated from a difference between the specified remaining amount in each tank and the remaining amount in the ink tank held in the printer unit 308 before detection.

The notification unit 502 notifies the user via the display unit 306 of the printer 104 of a prompt for ink replenishment in a case where it is determined that each ink tank remaining amount updated by the determination unit 501 is a remaining amount requiring ink replenishment.

Based on each ink bottle consumption amount updated by the determination unit 501, the transmission unit 503 transmits status information to the management server 102 via the network communication unit 304 of the printer 104 in a case where at least one ink bottle consumption amount reaches a predetermined threshold value. The details of the status information will be described later. A detailed description of the ink bottle ordering processing will be given later with reference to flowcharts shown in FIGS. 8 and 11.

The reset unit 504 resets each ink bottle consumption amount determined by the determination unit 501 as necessary.

Subscription to Consumable-Ordering Service

Figure 6:
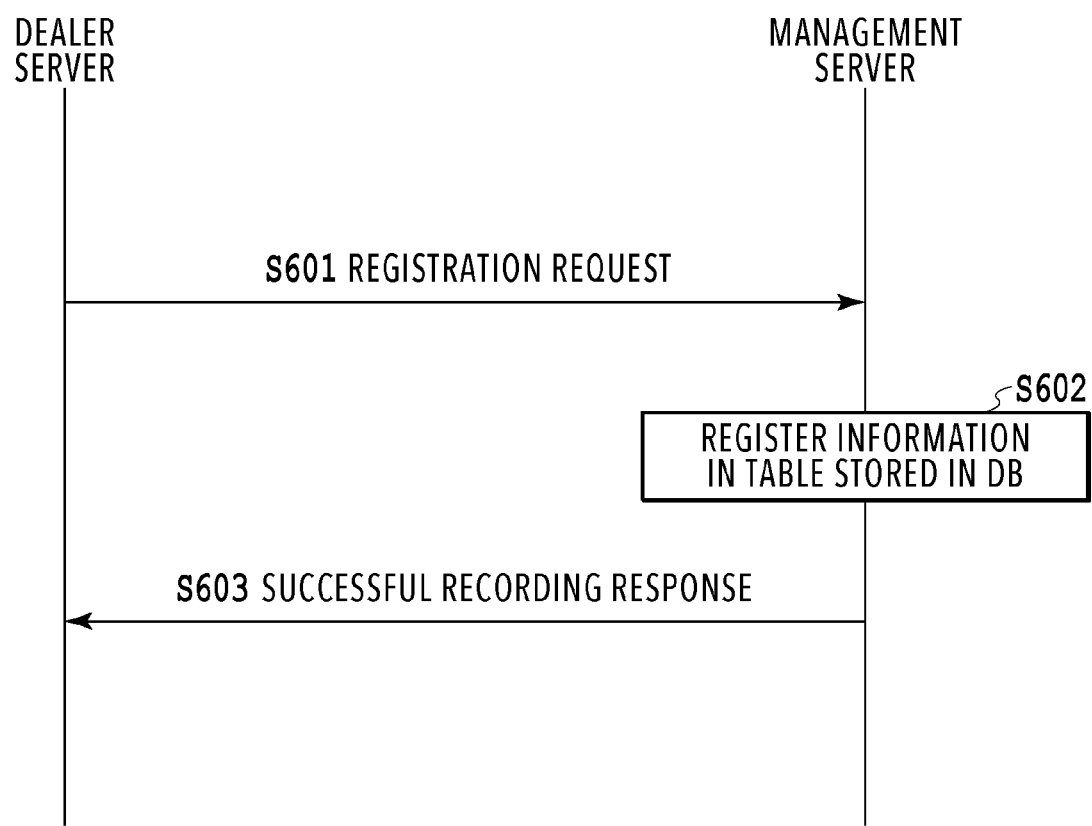
FIG. 6 is a sequence diagram at the time of subscription to a consumable-ordering service.

FIG. 6 is a sequence diagram showing an example of processing executed by the management server 102 and dealer server 103 at the time of subscribing to the consumable-ordering service. A description will be given of processing from subscription to the consumable-ordering service to consumable ordering in the present embodiment with reference to FIG. 6. A series of processes shown in the sequence of FIG. 6 is performed by each CPU 201 of the management server 102 and dealer server 103 loading a program code stored in the ROM 203 into the RAM 202 and executing the program code. Alternatively, some or all of the functions of steps in FIG. 6 may be implemented by hardware such as an ASIC or an electronic circuit. Additionally, hereinafter, "step S . . . " will be abbreviated as "S . . . ."

Upon receiving an application for subscription to the consumable-ordering service from the user, the dealer server 103 transmits a registration request to the management server 102 in S601. The registration request transmitted in this step includes various types of information such as a serial number for identifying the printer 104, a date and time, a consumable-type, and the model number of the ink bottle. For example, in a case where the consumable is ink, information on the consumable-type indicates whether a container for ink is an ink cartridge or an ink bottle. Incidentally, although a serial number is shown here as an example of identification information for specifying the printer, another piece of identification information such as a MAC address may be used.

In S602, the management server 102 registers the information acquired in S601 in each table stored in the database 209. FIGS. 7A and 7B are diagrams showing an example of various tables stored in the database 209 of the management server 102. FIG. 7A is a diagram showing an example of printer management tables.

The management server 102 associates the serial number of the printer 104 included in the registration request received from the dealer server 103 with the information on the consumable-type and holds them in a printer management table. Further, in the printer management table, a date and time and information indicating whether an order can be placed for each color of an ink bottle (referred to as order availability information) are held in association with each serial number. In a case where it is possible to place an order with the dealer server 103, "Yes" is registered as a value indicating an orderable state. On the other hand, "No" is registered as a value indicating an unorderable state. Incidentally, as an initial value at the time of service registration, "No" is registered.

FIG. 7B is a diagram showing an example of ink model number tables. The management server 102 associates the serial number of the printer 104 included in the registration request received from the dealer server 103 with the model number of an ink bottle of each color and holds them in the ink model number table. In S603, the management server 102 sends back a response indicating successful registration (referred to as a successful registration response) to the dealer server 103 in response to the registration request received in S601.

Processing of Status Information Transmission Performed by Printer

Figure 8:
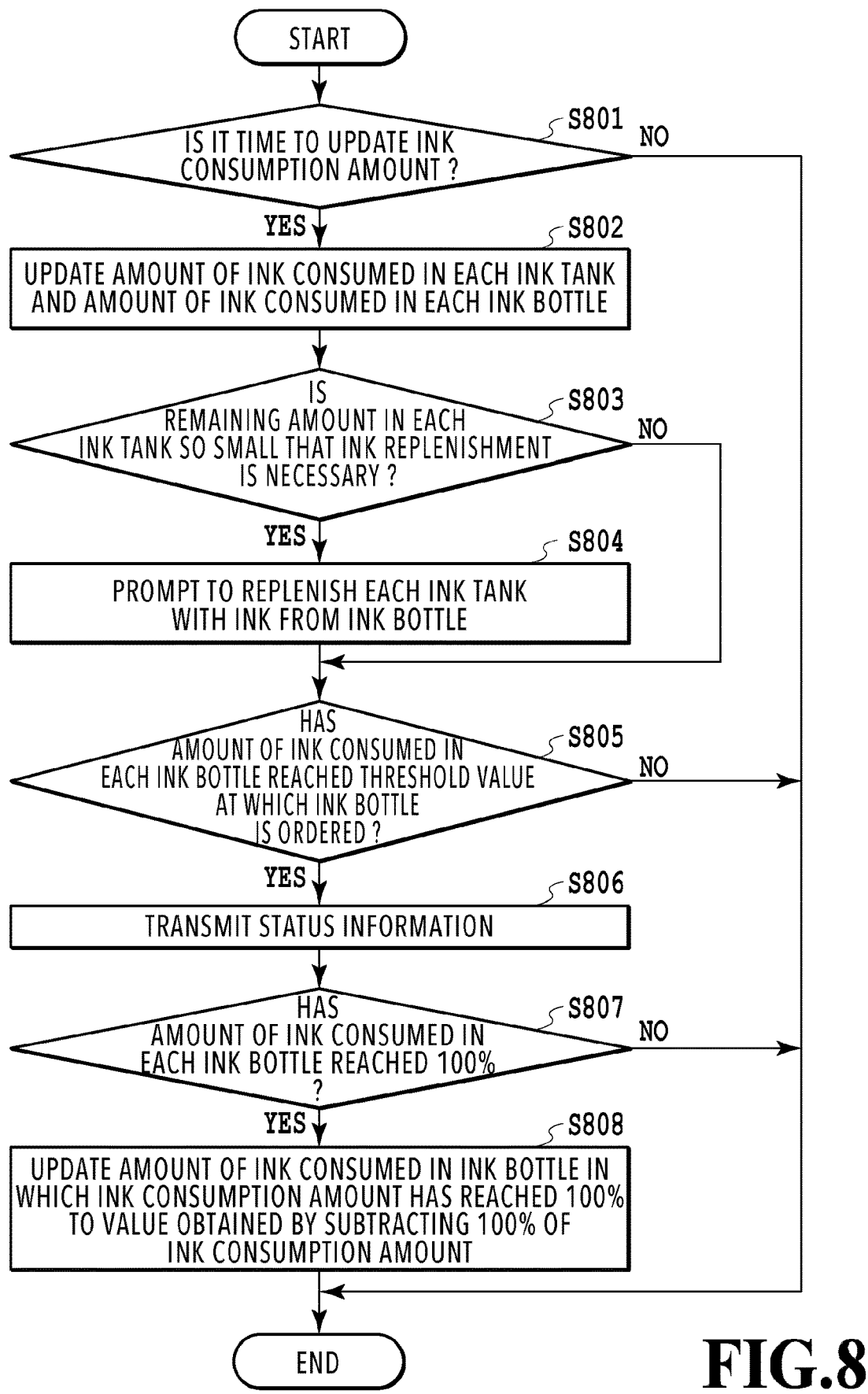
FIG. 8 is a flowchart of processing of status information transmission.

FIG. 8 is a flowchart showing the flow of processing of the printer 104 transmitting status information including consumable-information to the management server 102. In the present embodiment, the status information includes a printer serial number, the type of ink bottle of each color, and consumable-information (information indicating each ink bottle consumption amount). A description will be given of processing of the printer 104 transmitting the status information to the management server 102 with reference to FIG. 8. A series of processes shown in the flowchart in FIG. 8 is performed by the CPU 301 of the printer 104 loading a program code stored in the ROM 303 into the RAM 302, executing the program code, and functioning as each unit shown in FIG. 5. This flowchart is executed at any timing.

In S801, the CPU 301 functioning as the determination unit 501 determines whether it is time to update the ink consumption amount in the printer 104. Update is performed, for example, at power-on, after the cover is closed, after cleaning, during cleaning, at the time of arrival before cleaning, and after capping.

In a case where it is time to update the ink consumption amount, the CPU 301 executes, in S802, processing of updating of each ink tank remaining amount and the amount of ink consumed in each ink bottle.

In S803, the CPU 301 determines whether ink replenishment is necessary from the remaining amount in each ink tank of the ink tank unit 309 updated in S802. Specifically, it is determined whether the amount of ink remaining in the ink tank has reached a threshold value at which replenishment is required (replenishment threshold value). In a case where it is determined in S803 that each ink tank remaining amount does not require ink replenishment (has not reached the replenishment threshold value (is larger than the replenishment threshold value)), the process proceeds to S805. In a case where it is determined in S803 that each ink tank remaining amount requires ink replenishment (has reached the replenishment threshold value (is smaller than the replenishment threshold value)), the process proceeds to S804.

In S804, the CPU 301 functioning as the notification unit 502 notifies the user of a prompt for replenishment of an ink tank that needs to be replenished with ink from an ink bottle. For example, the display unit 306 of the printer 104 is caused to display a prompt for replenishment. Alternatively, in a case where the printer 104 has a voice output function, the printer 104 may notify the user of a prompt for ink replenishment by outputting voice. Alternatively, in a case where an LED is provided near the ink tank, the user may be prompted for replenishment with ink by turning on the LED.

The process then proceeds to S805, and it is determined whether the ratio of the ink consumption amount updated in S802 to the bottle capacity of each ink bottle has reached a threshold value (transmission threshold value) for ordering the ink bottle. For example, in a case where the transmission threshold value is set to 90% of an ink bottle with a capacity of 500 ml, a determination result becomes true in a case where the amount of ink consumed in the ink bottle reaches 450 ml.

In a case where the amount of ink consumed in each ink bottle has not reached the transmission threshold value and the determination result is false in S805, the process ends. In a case where the amount of ink consumed in at least one ink bottle of the ink bottles has reached the transmission threshold value in S805, the determination result is true, and the process proceeds to S806.

In step S806, the CPU 301 functioning as the transmission unit 503 performs control to transmit status information including consumable-information (information indicating an ink bottle consumption amount) to the management server 102 via the network communication unit 304 and the network connection unit 305.

Figure 9A:
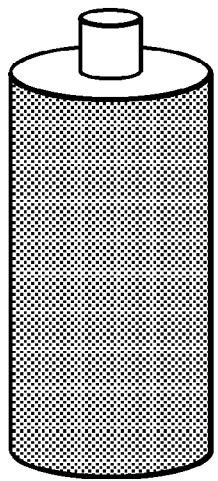
FIGS. 9A to 9C are schematic diagrams showing a consumption amount in an ink bottle.
Figure 9B:
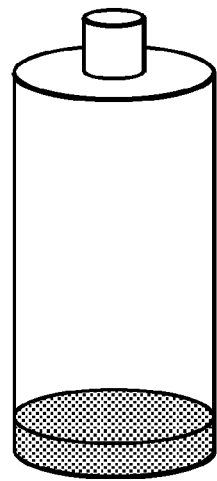
Figure 9C:
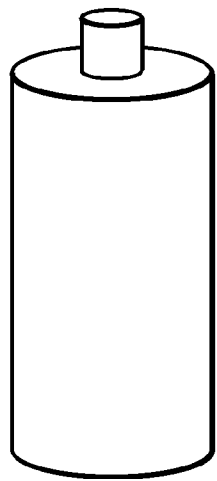

FIGS. 9A to 9C are diagrams showing states where the ink bottle consumption amount is 0%, 90%, and 100%. The transmission of the status information is performed in a case where the ratio of the amount of ink consumed in the ink bottle to an ink amount of one ink bottle reaches the transmission threshold value, and is not performed in a case where the transmission threshold is not reached. That is, it is performed in a case where it is determined that a state of 0% ink consumption amount as shown in FIG. 9A enters a state where 90% or more of ink is consumed as shown in FIG. 9B. The 10% difference in ink capacity is a margin set in consideration of a time from when the ink bottle is ordered until the ink bottle is delivered to the user. The count of an ink consumption amount is not reset at the timing of ordering of the ink bottle, but must be reset after counting the amount of ink for one ink bottle as shown in FIG. 9C. In a case where the ink consumption amount is reset at the timing of ordering of the ink bottle, in a case where a threshold value for ordering of the ink bottle is 90% of the ink consumption amount, an error of 10% of the ink consumption amount is accumulated each time the ink bottle is ordered. Thus, reset processing is not performed until the count of the amount of ink consumed in the ink bottle reaches 100%.

In S807, it is determined whether the amount of ink consumed in each ink bottle updated in S803 has reached 100%. In a case where it is determined in S807 that the amount of ink consumed in each ink bottle has not reached 100%, the process ends. In a case where it is determined in S807 that the amount of ink consumed in each ink bottle has reached 100%, the process proceeds to S808.

In S808, for each ink bottle whose ink consumption amount has reached 100%, the ink consumption amount is updated to a value obtained by subtracting 100% of the ink consumption amount, and the process ends. In S807, for example, for an ink bottle whose ink consumption amount has reached 105%, the value is updated to 5% obtained by subtracting a value of 100% of the ink consumption amount from 105% of the ink consumption amount in S808, and the process ends.

As a result, since the amount of ink actually consumed is counted, even if the ink tank is replenished with ink from the ink bottle in the middle of use, it is possible to order a new ink bottle before the ink bottle becomes empty. Therefore, the user can suppress ink from running out.

However, in a case where the ink bottle is discarded without being used up or where the same ink bottle is used in another printer, the ink consumption amount is counted incorrectly. In the present embodiment, the function of forcibly resetting the amount of ink consumed in each ink bottle by user's operation is provided as the reset unit 504. In a case where the ink bottle is used up each time, there is no need to forcibly clear the amount of ink consumed in the ink bottle. The reset unit 504 is mainly used in a case where it is necessary to reset the amount of ink consumed before using a new ink bottle.

FIGS. 10A to 10D are diagrams illustrating reset processing performed by the reset unit 504. A description will be given below of a method of forcibly clearing the amount of ink consumed in each ink bottle by using the operation unit 205 and selecting an item for forcibly clearing the amount of ink consumed in each ink bottle according to a maintenance setting menu displayed on the display unit 206.

Figure 10A:
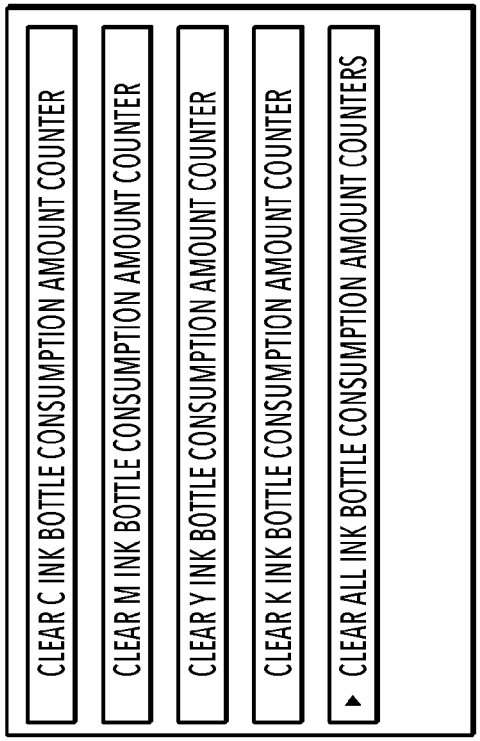
FIGS. 10A to 10D are schematic diagrams of a display unit in which an ink bottle consumption amount counter is reset.
Figure 10C:
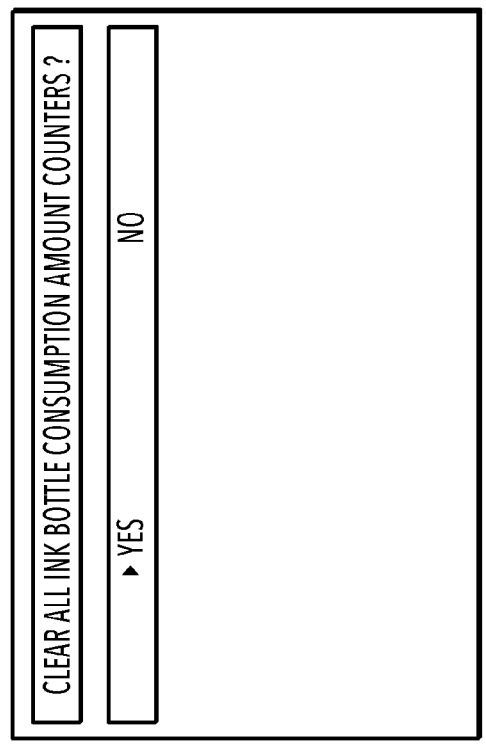
Figure 10B:
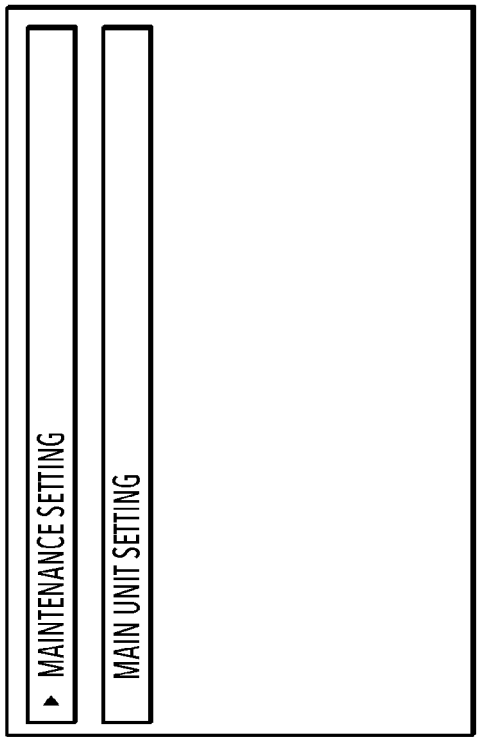

Specifically, the user selects "MAINTENANCE SETTING MENU" in FIG. 10A displayed on the display unit 206. Then, "CLEAR INK BOTTLE CONSUMPTION AMOUNT COUNTER" is selected from a display menu in FIG. 10B displayed thereafter. From a display menu in FIG. 10C displayed thereafter, a bottle for which an ink bottle consumption amount counter is intended to be cleared (set to 0%) is selected. In a case where all ink bottle consumption amount counters are intended to be cleared, "CLEAR ALL INK BOTTLE CONSUMPTION AMOUNT COUNTERS" is selected from the display menu in FIG. 10C.

Figure 10D:
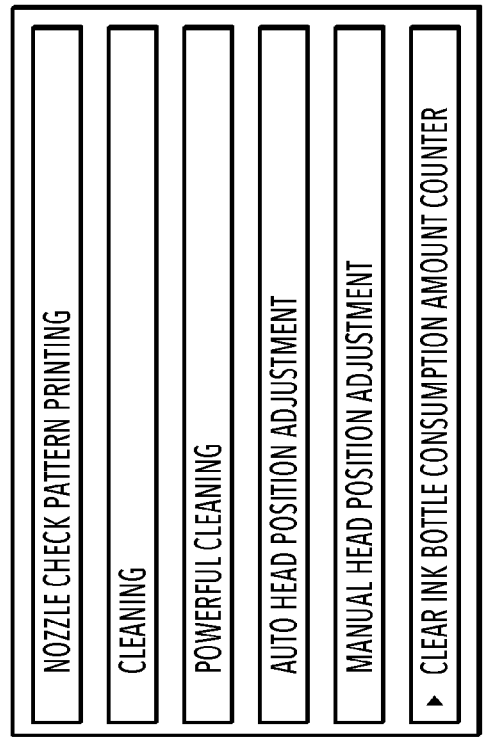

The user selects "YES" from a menu in which "CLEAR ALL INK BOTTLE CONSUMPTION AMOUNT COUNTERS?" is displayed in FIG. 10D displayed thereafter, so that all ink bottle consumption amount counters are cleared. That is, in a case where the reset unit 504 detects that each item in FIG. 10C or "YES" in FIG. 10D is selected, the corresponding ink bottle consumption amount counter is reset.

Processing of Ordering of Consumable Performed by Management Server

Figure 11:
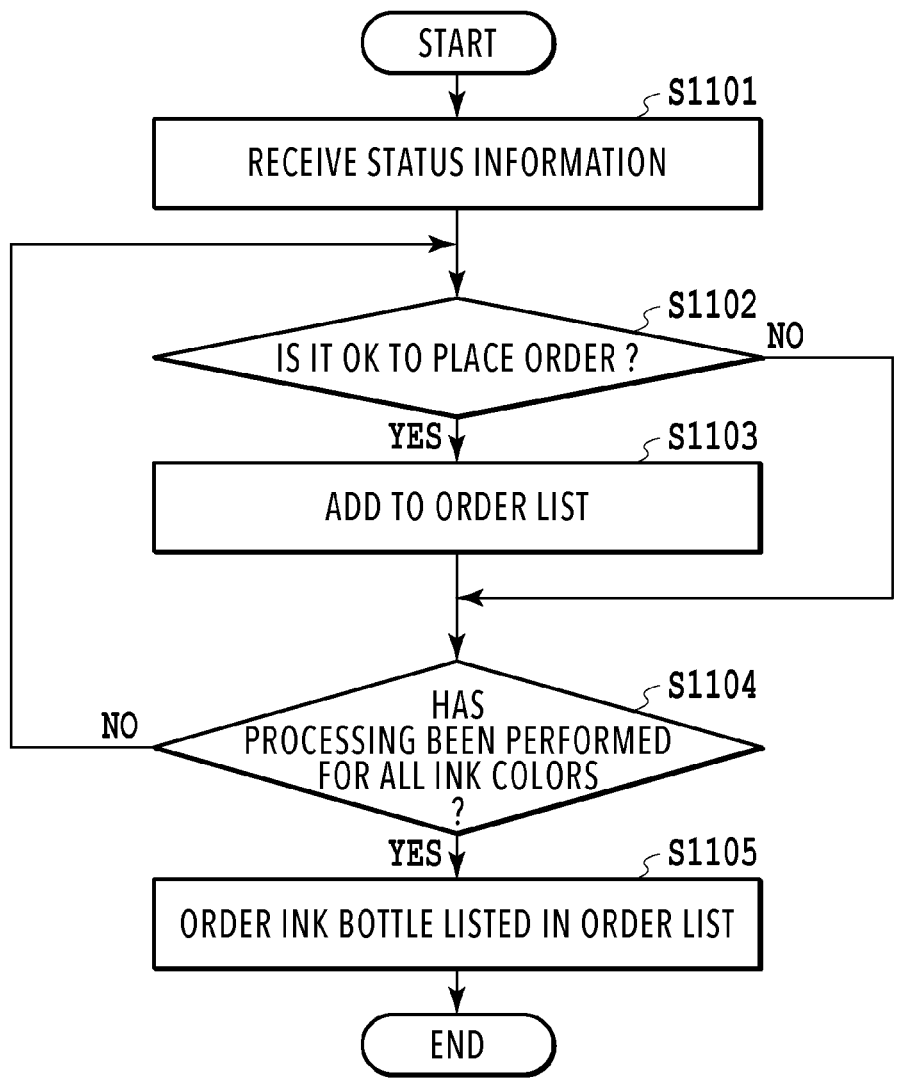
FIG. 11 is a flowchart of consumption-ordering processing by the management server.

FIG. 11 is a flowchart showing the flow of processing until the management server 102 notifies the dealer server 103 of ordering of an ink bottle. A description will be given of processing of ordering of a consumable from the dealer server 103 by the management server 102 in the present embodiment with reference to FIG. 11. Incidentally, processing in each step shown in FIG. 11 is performed by the CPU 201 of the management server 102 loading a program code stored in the ROM 203 or the storage device 204 into the RAM 202 and executing the program code.

In S1101, the management server 102 receives status information including information indicating the ink bottle consumption amount transmitted by the printer 104.

In S1102, the CPU 201 changes the order availability information held in a table based on the status information received in S1101. Then, whether to perform ordering processing is determined based on this order availability information. In the present embodiment, a state where information indicating an ink bottle consumption amount included in status information is equal to or greater than a threshold value (for example, the ratio of an ink consumption amount to an ink bottle capacity is equal to or greater than 90%) and less than the capacity of the ink bottle is defined as a low status. In the case of an ink bottle of which a status based on the status information is a low status and in a case where the management server 102 has not performed processing of ordering of that ink bottle, the management server 102 updates the held order availability information on that ink bottle to "Yes." As a result, the determination result becomes true, and the process proceeds to S1103. On the other hand, in a case where the status becomes a low status once and ordering processing has already been performed, even if the status information is received, the order availability information indicates "No" and remains unchanged. As a result, even if the status based on the status information is a low status, since the order availability information is "No," the determination result in this step is false, and the process proceeds to S1104. Incidentally, in a case where a value of the information indicating the ink bottle consumption amount included in the status information received from the printer 104 reaches the capacity of the ink bottle, the low status of the ink bottle of the printer is canceled. Thus, the next time status information is received, the order availability information becomes "Yes," and the determination result becomes true.

In S1103, the CPU 201 adds an ink bottle of a target color to an order list. In S1104, the CPU 201 determines whether ink bottle order determination processing and, if necessary, ink bottle ordering processing have been performed for ink tanks of all colors mounted in the printer 104. In other words, it is determined whether the steps of S1102 and S1103 have been performed. In a case where the determination result of this step is true, the process proceeds to S1105. On the other hand, in a case where the determination result of this step is false (where there is an ink bottle of an unprocessed color), the process returns to S1102, and the steps of S1102 and S1103 are repeated until processes for all ink colors are completed.

In S1105, the CPU 201 executes processing for ordering, from a dealer, ink bottles listed in the order list. Specifically, the CPU 201 notifies the dealer server 103 of information on combinations of ink colors and ink bottle model numbers listed in the order list. In the ordering processing, before the dealer server 103 is notified, the user of the printer 104 may be asked as to whether to place an order by e-mail or the like. Then, in a case where the user permits ordering, the dealer server 103 may be notified of the ordering.

As described above, according to the present embodiment, it is possible to order an ink bottle at appropriate timing. Thus, it is possible to suppress ordering an ink bottle in a state where the ink bottle has a sufficient amount of ink or where the ink bottle has already run out of ink. Further, in the present embodiment, status information is not always sent, but is sent in a case where the threshold value is exceeded in an ink bottle of at least one color of ink bottles of respective colors, so that communication load between the printer and the server can be reduced.

OTHER EMBODIMENTS

In the embodiment described above, it is determined that an ink tank needs to be replenished with ink from an ink bottle in a case where the amount of ink remaining in the ink tank reaches a replenishment threshold value. However, whether replenishment is necessary may also be determined based on an ink consumption amount without obtaining an ink remaining amount. Specifically, whether the ink consumption amount has reached a predetermined threshold value (whether the ink consumption amount is greater than the predetermined threshold value) is determined, and in a case where it has, it may be determined that ink replenishment is necessary.

Incidentally, both the amount of ink remaining in an ink tank and the amount of ink consumed in the ink tank are values related to ink consumption in the ink tank. Thus, it is preferable to determine whether ink replenishment is necessary based on a value related to the ink consumption in the ink tank.

Further, in the embodiment described above, it is determined whether the amount of ink consumed in an ink bottle has reached a transmission threshold value, and status information is transmitted in a case where the transmission threshold value is reached. However, the determination may be made based on the amount of ink remaining in the ink bottle. Specifically, whether the amount of ink remaining in the ink bottle has reached the predetermined threshold value (whether the remaining amount of ink is less than the predetermined threshold value) is determined, and in a case where the predetermined threshold value is reached, the status information may be transmitted.

It should be noted that both the amount of ink consumed in an ink bottle and the amount of ink remaining in the ink bottle are values related to ink consumption in the ink bottle. Thus, the transmission of the status information may be controlled based on the value related to the ink consumption in the ink bottle.

The present disclosure can also be implemented by processing of supplying a program that implements one or more functions of the embodiment described above to a system or device via a network or a storage medium and one or more processors in a computer of the system or device reading and executing the program, or can also be implemented by a circuit (e.g., an ASIC) that implements one or more functions.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A recording apparatus including (1) an ink tank storing ink supplied from an ink bottle and (2) a head to which ink is supplied from the ink tank, the recording apparatus comprising:
    a determination unit configured to determine, based on a first value related to ink consumption in the ink tank, a second value related to ink consumption in the ink bottle;
    a transmission unit configured to transmit a notification including information related to the ink consumption in the ink bottle to a server; and
    an update unit configured to update automatically the second value related to ink consumption in the ink bottle to a value obtained by subtracting a value corresponding to one ink bottle from the second value related to ink consumption in the ink bottle in a case where the second value related to ink consumption in the ink bottle reaches a first threshold value, wherein the update unit is further capable of receiving an instruction from a user to reset the second value related to ink consumption in the ink bottle, and the update unit resets the second value related to ink consumption in the ink bottle in accordance with the instruction from the user.

2. The recording apparatus according to claim 1, wherein the first value related to ink consumption in the ink tank is an amount of ink consumed in the ink tank.

3. The recording apparatus according to claim 1, wherein the determination unit determines the first value related to ink consumption in the ink tank and the second value related to ink consumption in the ink bottle at predetermined timing.

4. The recording apparatus according to claim 3, wherein the predetermined timing includes a time at power-on, after a cover is closed, after cleaning, during cleaning, at a time of arrival before cleaning, or after capping.

5. The recording apparatus according to claim 1, further comprising a notification unit configured to notify a user of a prompt for ink replenishment of the ink tank with the ink from the ink bottle in a case where a remaining amount in the ink tank which is determined based on the first value related to ink consumption in the ink tank is a predetermined remaining amount.

6. The recording apparatus according to claim 1, wherein the transmission unit further transmits a serial number of the recording apparatus and a model number of the ink bottle.

7. The recording apparatus according to claim 1, wherein the recording apparatus comprises a plurality of ink tanks, and wherein the transmission unit transmits the notification to the server in a case where a second value related to ink consumption in at least one ink bottle from which ink is supplied to any one ink tank of the plurality of ink tanks reaches a second threshold value.

8. The recording apparatus according to claim 1, wherein the notification is transmitted to a management server that performs processing of ordering of the ink bottle from a dealer server relating to ink bottle distribution, the management server being the server.

9. The recording apparatus according to claim 1, wherein the first value related to ink consumption in the ink tank is an ejection amount of ink ejected from the head during printing.

10. The recording apparatus according to claim 1, wherein the first value related to ink consumption in the ink tank is a remaining amount in the ink tank.

11. The recording apparatus according to claim 1, wherein the second value related to ink consumption in the ink bottle is an amount of ink consumed in the ink bottle.

12. The recording apparatus according to claim 1, wherein the second value related to ink consumption in the ink bottle is a value indicating a ratio of (1) a consumption amount in the ink bottle to (2) an ink capacity in the ink bottle.

13. A method of controlling a recording apparatus, the recording apparatus including (1) an ink tank storing ink supplied from an ink bottle and (2) a head to which ink is supplied from the ink tank, the method comprising:

determining, based on a first value related to ink consumption in the ink tank, a second value related to ink consumption in the ink bottle;

transmitting a notification including information related to the ink consumption in the ink bottle to a server; and updating automatically the second value related to ink consumption in the ink bottle to a value obtained by subtracting a value corresponding to one ink bottle from the second value related to ink consumption in the ink bottle in a case where the second value related to ink consumption in the ink bottle reaches a first threshold value, wherein the updating is further capable of receiving an instruction from a user to reset the second value related to ink consumption in the ink bottle, and the updating resets the second value in accordance with the instruction from the user.

14. A non-transitory computer-readable storage medium storing a program which causes a computer to be operable in a recording apparatus, the recording apparatus including (1) an ink tank storing ink supplied from an ink bottle and (2) a head to which ink is supplied from the ink tank, wherein the program causes the computer to function as a plurality of units comprising:

a determination unit configured to determine, based on a first value related to ink consumption in the ink tank, a second value related to ink consumption in the ink bottle;

a transmission unit configured to transmit a notification including information related to the ink consumption in the ink bottle to a server; and an update unit configured to update automatically the second value related to ink consumption in the ink bottle to a value obtained by subtracting a value corresponding to one ink bottle from the second value related to ink consumption in the ink bottle in a case where the second value related to ink consumption in the ink bottle reaches a first threshold value, wherein the update unit is further capable of receiving an instruction from a user to reset the second value related to ink consumption in the ink bottle, and the update unit resets the second value in accordance with the instruction from the user.

* * * * *